(12) United States Patent
Zorzo (10) Patent No.: US 9,714,857 B2
(45) Date of Patent: Jul. 25, 2017

(54) DOSING DEVICE FOR SOAKING A CLEANING CLOTH WITH DETERGENT

(71) Applicant: Renato Zorzo, Onara (IT)

(72) Inventor: Renato Zorzo, Onara (IT)

(73) Assignee: T.T.S. S.R.L., Santa Giustina in (IT)

( * ) Notice: Subject to any disclaimer, the term of this patent is extended or adjusted under 35 U.S.C. 154(b) by 0 days.

(21) Appl. No.: 14/769,804

(22) PCT Filed: Feb. 24, 2014

(86) PCT No.: PCT/IB2014/059207
§ 371 (c)(1),
(2) Date: Aug. 22, 2015

(87) PCT Pub. No.: WO2014/128671
PCT Pub. Date: Aug. 28, 2014

(65) Prior Publication Data
US 2016/0003659 A1   Jan. 7, 2016

(30) Foreign Application Priority Data
Feb. 25, 2013   (IT) .............................. PD2013A0042

(51) Int. Cl.
*G01F 11/32* (2006.01)
*B67D 3/00* (2006.01)
*A47L 13/50* (2006.01)
*B08B 13/00* (2006.01)

(52) U.S. Cl.
CPC .............. *G01F 11/32* (2013.01); *A47L 13/50* (2013.01); *B08B 13/00* (2013.01); *B67D 3/0045* (2013.01)

(58) Field of Classification Search
CPC .......... G01F 11/32; A47L 13/50; B08B 13/00; B67D 3/0045
USPC ........................................................ 222/509
See application file for complete search history.

(56) References Cited

U.S. PATENT DOCUMENTS

| 1,306,150 | A | * | 6/1919 | Kessler | ................ | B65D 25/385 |
| | | | | | | 137/614.19 |
| 2005/0230414 | A1 | * | 10/2005 | Yoshida | ............... | B67D 3/0003 |
| | | | | | | 222/1 |

FOREIGN PATENT DOCUMENTS

| EP | 0264745 A1 | 4/1988 |
| EP | 1736091 A1 | 12/2006 |
| GB | 2127779 A | 4/1984 |

\* cited by examiner

*Primary Examiner* — Donnell Long
(74) *Attorney, Agent, or Firm* — Quickpatents, LLC; Kevin Prince (57) ABSTRACT

This invention concerns a device for dosing a liquid detergent for soaking cleaning cloths, which releases an exact amount of liquid detergent; in particular, the invention refers to the actuating devices for operating the valve that the above-mentioned dosing device is fitted with.

9 Claims, 7 Drawing Sheets

DOSING DEVICE FOR SOAKING A CLEANING CLOTH WITH DETERGENT

CROSS-REFERENCE TO RELATED APPLICATIONS

This application claims the benefit of PCT Patent Application PCT/IB2014/059207, filed on Feb. 24, 2014 and Italian Patent Application PD2013/A000042, filed on Feb. 25, 2013, both incorporated herein by reference.

STATEMENT REGARDING FEDERALLY SPONSORED RESEARCH AND DEVELOPMENT

Not Applicable.

FIELD OF THE INVENTION

The field of this invention concerns a device for dosing a liquid detergent for soaking a cleaning cloth with a previously calibrated amount of liquid. In particular, the object of the invention concerns actuating devices for displacing the valve with which the above-mentioned dosing device is fitted.

DISCUSSION OF RELATED ART

In the professional cleaning industry there are dosing devices that tend to optimize the consumption of the liquid detergent, not only to avoid waste, but above all as an aid for operators in carrying out the various operations.

In fact, with the above-mentioned dosing device the various operations of dilution and soaking of a cleaning cloth with an optimal amount of detergent is easy and extremely precise.

In fact, the amount of liquid detergent that has to soak a cloth varies according to the type of cloth, and also the nature of the surface to be cleaned.

For these and other reasons, the dosing device in the professional cleaning industry is proving to be an essential instrument for professional operators.

Evidently, because of its widespread use by the above-mentioned operators and because it is an article that can be used immediately, dosing devices need to be fitted with actuating devices that are simple and intuitive to use.

It is equally evident that because these instruments are aimed at the professional sector it is indispensable that they are reliable over time.

The dosing devices that are currently sold on the market do not meet the requirement of having actuating devices that are easy and intuitive to use, and above all they are completely unreliable.

Indeed, some of them have operating controls that are not easy to see, or else difficult to use, and they are also not so intuitive with a movement that is opposite to what the operator might expect.

Moreover, all the above-mentioned dosing devices have actuators equipped with interrelated moving parts that are located within the structure of each device and that are somewhat hidden, therefore they cannot be seen and are continually exposed to the aggressive detergents used.

Indeed, with the continual cycle of dampness and dryness involved in the various cleaning operations, these moving parts get a layer of residue that over time obstruct and compromise the correct movement of the parts.

Finally, as is well known to sector experts, the above-mentioned actuating devices, fitted with numerous metallic springs, require continual maintenance for replacing these metallic springs that deteriorate due to corrosion from the aggressive detergents used.

Replacing these metallic springs inside the structure of the dosing devices, and working on the related moving parts, requires the complete disassembly, which should be carried out only by technically skilled personnel.

So, these actuating devices of these dosing devices are quite unreliable and not very ergonomic, and above all they require continuous maintenance.

Coming now to the actual modes of operation, we see that the operator, after gripping the respective actuating devices, is forced, after the displacement that induces the valve to open, to hold these same actuating devices in the opening position until the storage chamber with which the dosing device is fitted is completely empty.

Because sometimes the operators are impatient, and above all because it cannot be verified how much time the operation for completely emptying the storage chamber requires, very often the emptying operation is terminated early by the operator, without the liquid detergent storage chamber being fully emptied, and thereby frustrating the meaning itself of using a dosing device.

In fact, the operator tends to prematurely end the detergent release phase by closing the dosing device's valve, because in some dosing devices, especially in the final phase of releasing the last of the liquid detergent in the chamber, this liquid flows out at an exasperatingly slow rate.

SUMMARY OF THE INVENTION

The purpose of this invention is to overcome one or more of the above-mentioned drawbacks.

Another purpose of this invention is to make available actuating devices of a dosing device that is reliable over time.

A further purpose of this invention is to make available actuating devices of a dosing device that are visible, exposed for easy gripping and which are easily used by the operator.

An even further purpose of this invention is to make available actuating devices of a dosing device whose movement is intuitive, and does not require any particular training or special information for the personnel.

Another purpose of this invention is to make available actuating devices of a dosing device that can easily be controlled, and above all inspected, without the need for disassembling the internal parts of the dosing device, and that can be carried out by technically competent personnel.

An additional purpose of this invention is to make available actuating devices of a dosing device that are efficient from a mechanical viewpoint, without requiring cumbersome operating levers or prolonged and excessive force on the part of the operator.

A different purpose of this invention is to make available actuating devices of a dosing device that have none of the drawbacks of a continual wetting-drying.

An even further purpose of this invention is to make available actuating devices of a dosing device whose elastic parts are not exposed and/or subject to premature deterioration.

An additional purpose of this invention is to make available actuating devices of a dosing device that can be easily maintained even by the operators themselves without the need to call skilled technical personnel.

Another purpose of this invention is to make available actuating devices of a dosing device that can be operated immediately without the operator being forced to waste an enormous amount of time moving them and holding them.

A further purpose of this invention is to make available actuating devices of a dosing device that can provide an immediate indication of how much time is left before the liquid detergent is completely released from the storage chamber.

Technical Solution

All the above-mentioned purposes are fulfilled by the actuating devices of a dosing device as shown and characterized by the attached claims.

In particular, the subject of this invention consists of actuating devices for displacing a valve inside a dosing device, which is fitted with a storage chamber and on the bottom has an outlet pipe for releasing the liquid detergent stored inside said chamber, and because said outlet section of said outlet pipe is closed by said valve and forced to open with a straight line movement along its main axis by said actuating devices, beneficially said actuating devices are joined to said valve by means of a connection on the outside of said dosing device.

In particular, said connection between the valve and the actuating devices, on the outside of said dosing device, is configured as an extension of the valve outside the dosing device, which is joined to a track whose generatrix has a diverging radius, at the end of an arm of a lever, whose opposite arm, with respect to the hinging fulcrum, can be gripped for the operating movement.

Advantageous Effects

Advantageously said lever is pivoted on the outside of said dosing device, and can be easily accessed and inspected.

Said lever that can be gripped and operated by the operator is ergonomically available at the front of said dosing device.

The movement of said lever, which can be gripped and operated by the operator, ideally reproduces the state of the flow of the liquid detergent, facilitating the intuitive learning how to operate the dosing device.

Advantageously said lever has its rotation travel limited at the top and bottom by an end stop corresponding to the situation of the valve in the opening and closing conditions of the outlet pipe.

The travel of the of the lever from down upwards, advantageously related to a linear lowering of the valve with the respective opening of the outlet pipe of the liquid detergent stored inside the dosing device, is carried out directly by the operator by gripping a handle on the end of the front arm.

The travel of the lever from down upwards, advantageously related to a linear raising of the valve with the respective closing of the outlet pipe of the detergent liquid that has already flowed from the dosing device into the soaking basin beneath, is stimulated by elastic devices, outside the dosing device, that act either directly on the valve, near the lower end, or directly on the operating lever.

Advantageously said travel of the movement of the lever for reclosing the valve is conveniently slowed down by a motion or clutch damper device that prolongs the closure of the valve, providing a degree of certainty that all the liquid stored is drained off from the dosing device before the outlet pipe is completely closed by the valve.

DESCRIPTION OF THE DRAWINGS

The technical features of the invention, according to the above-mentioned purposes, can be clearly seen in the content of the claims below and its advantages will be even clearer in the detailed description that follows, made with reference to the attached drawings, which represent a form that is purely by way of example and in no way limited, where:

DETAILED DESCRIPTION OF THE PREFERRED EMBODIMENT

The dosing device 1 is a device capable of receiving, retaining and releasing upon a command a pre-determined amount of liquid detergent.

On the top of the dosing device 1 there is a tank 17 full of liquid detergent, with a hole on the bottom for a hydraulic connection, by means of an inlet pipe 3, with the inside of the body 2 of the dosing device 1.

The inside of the body 2 of the dosing device 1 is composed of a chamber 5 for storing a variable volume, capable of storing a certain amount of liquid detergent coming from said tank 17 on top of said dosing device 1.

The variation of this volume takes place using the rotation of a handle 7, on the front part of the body 2, which moves a partition 6 inside the chamber 5.

After this variable volume chamber 5 has been filled with liquid detergent and the relative inlet pipe 3 has been hermetically closed by a gasket 11 coupled to the top part (9, 18) of this valve 8, the outlet pipe 4 opens to release said liquid detergent into a basin below for soaking the cleaning cloth.

In particular said valve 8 has a special gasket 12 on its lower part 10 for closing the outlet pipe 4.

Advantageously the valve 8 of the invention both opens and closes the inlet pipe 3 and outlet pipe 4 of the dosing device 1.

At the lower end of the valve 8 there is a connection 19 that joins with the actuating devices 20 for its displacement between the two pre-defined positions of opening and closing the outlet pipe 4.

Advantageously said actuating devices are composed of a pair of levers 14, whose front arms 21, protruding from the front of the body 2 of said dosing device 1, are, at their front end, connected together by a grip 15 that can be moved by the operator.

Said levers are hinged on the outside of the dosing device 1 along the horizontal axis, so they can be moved by the operator with a rotation movement from up downwards, forcing the flow of the liquid detergent from the top tank 17 to the lower basin.

Said hinging of the actuating devices 20 to the outside of the body 2 of the dosing device 1 corresponds to the pivot 26 of the levers 14.

The arm 22 of the levers 14, opposite to the front one 21 protruding at the front, is connected, near its free end with the connection 19 protruding at the bottom 13 of the valve.

Advantageously said connection 19 is solidly joined to said lower protruding part 19 of the valve 8, and can be a single piece.

Advantageously said connection is made using the constraint between a linchpin 23 forced to move within a track slot 24 with a generatrix with an increasing radius.

With this connection you obtain the linear displacement of the valve 8 by means of the rotation of the levers 14 of the actuating devices 20.

The repositioning in the raised condition of the valve 8 for closing the outlet tube 4 for releasing the liquid detergent, occurs automatically stimulated by elastic devices (eventually protected by a protection 25), which can act directly on the lower part of the valve 8 or directly on the levers 14.

However, to prevent the outlet tube closing too quickly, without all the liquid stored in said dosing device 1 being released, the return movement is dampened and slowed down by a clutch 16, which preferably acts on the levers 14.

This clutch, however, is operational and effective preferably with the valve 8 in the condition of maximum opening to then fail or become non-operational, accelerating the transient state of closing near the repositioning closing phase of the outlet pipe 4 for the release of the liquid detergent.

Figure 1:
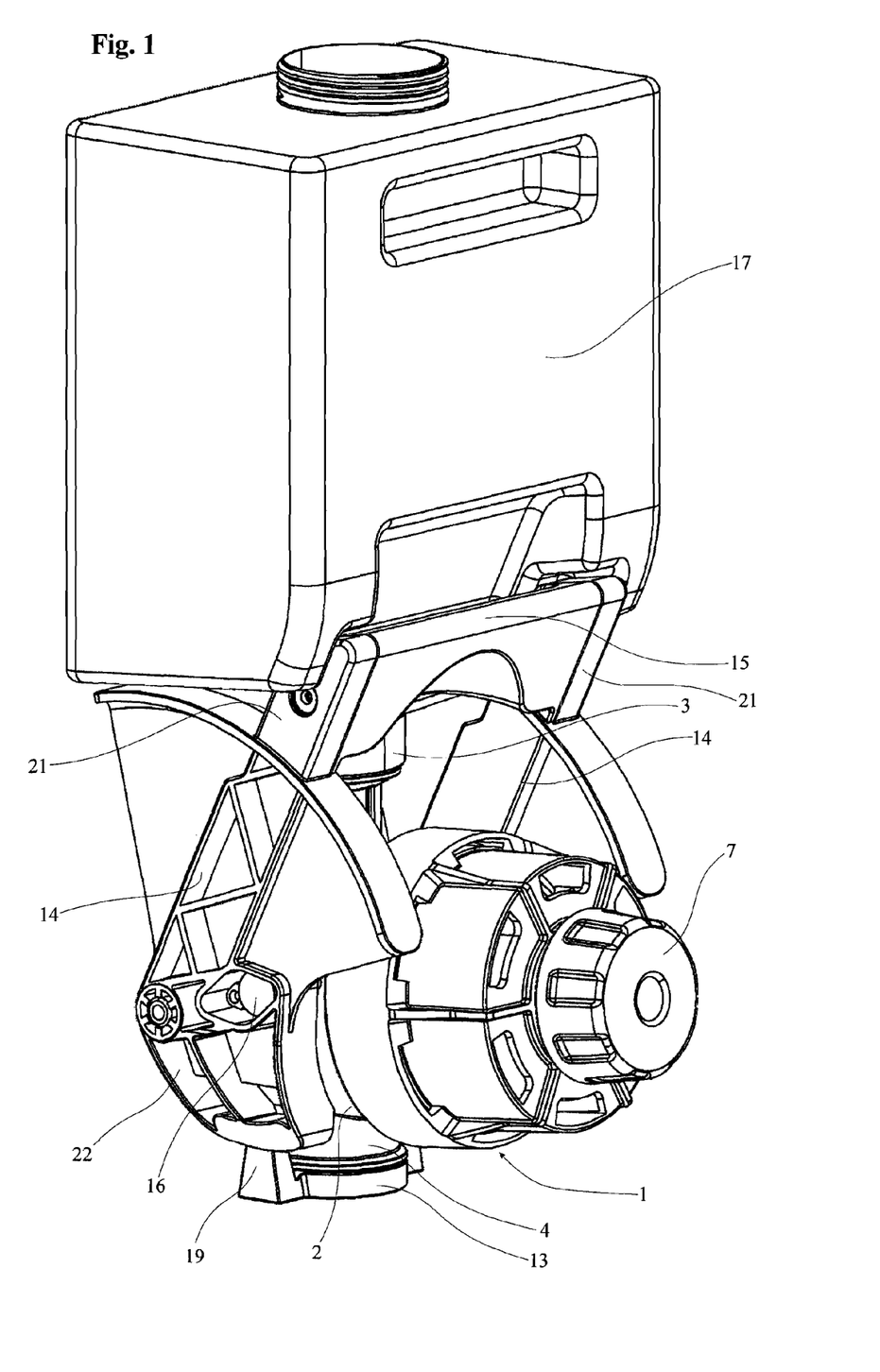
FIG. 1 shows a perspective view of the invention.
Figure 2:
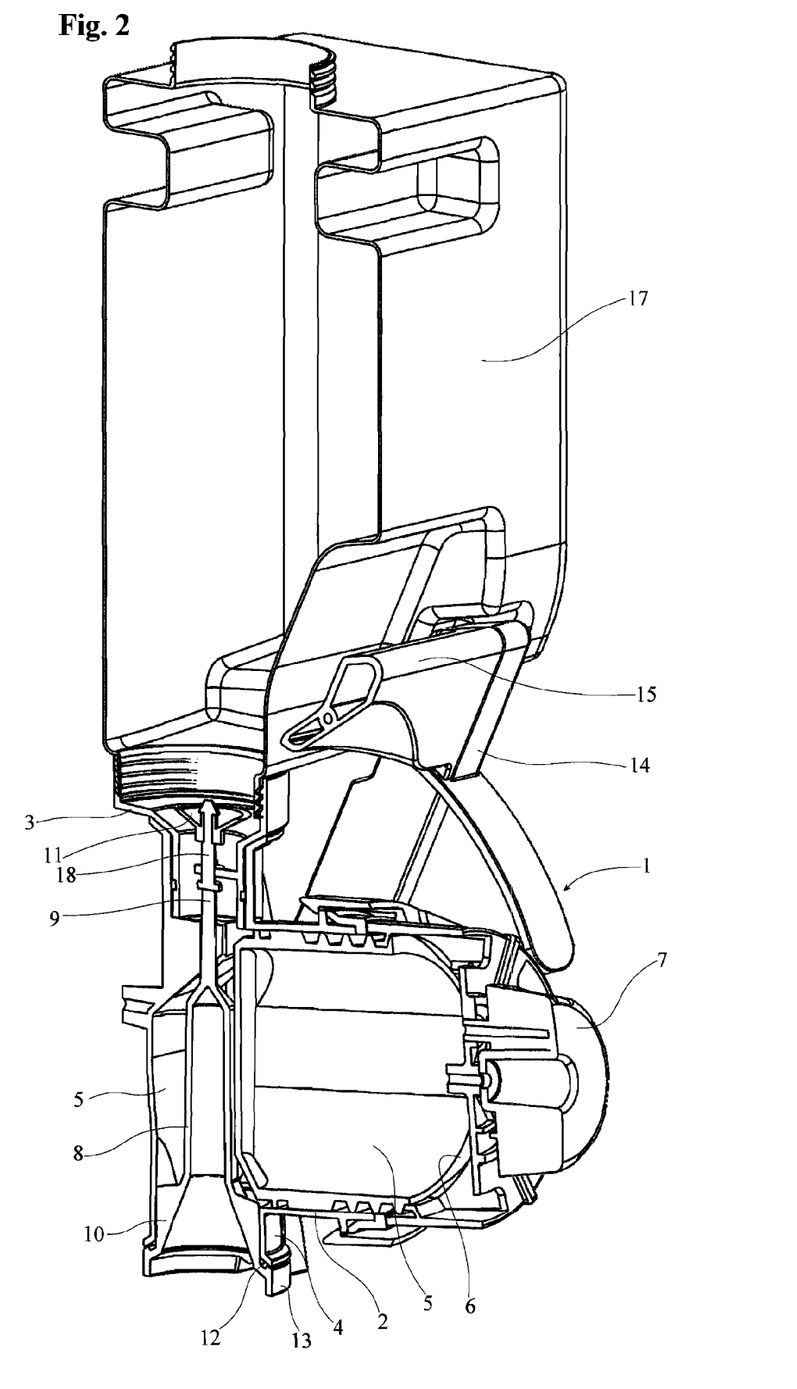
FIG. 2 shows a cross-section according to a vertical symmetrical plane and passing through the valve body.
Figure 3:
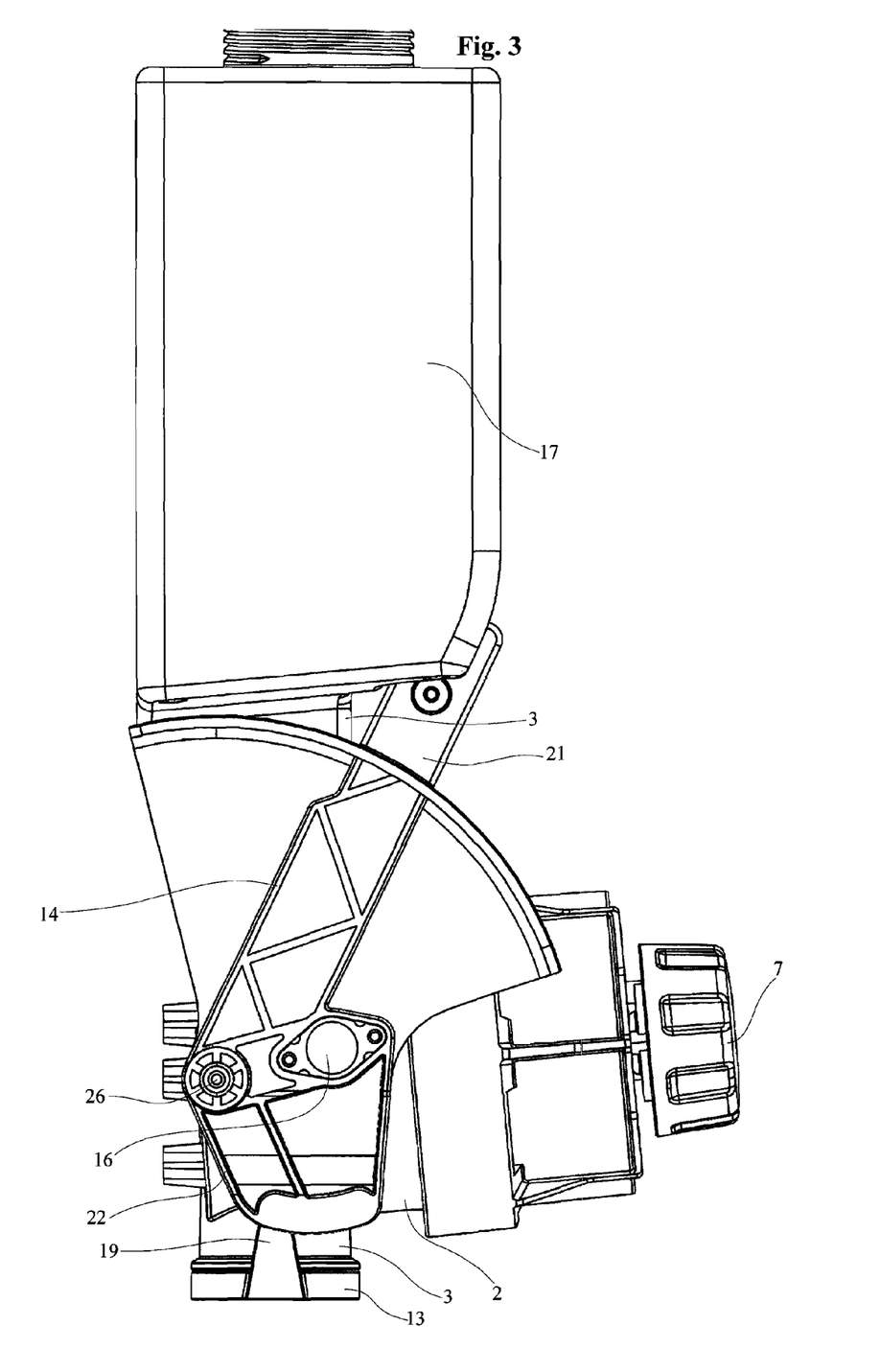
FIG. 3 shows the object of the invention according to a side plan view.
Figure 4:
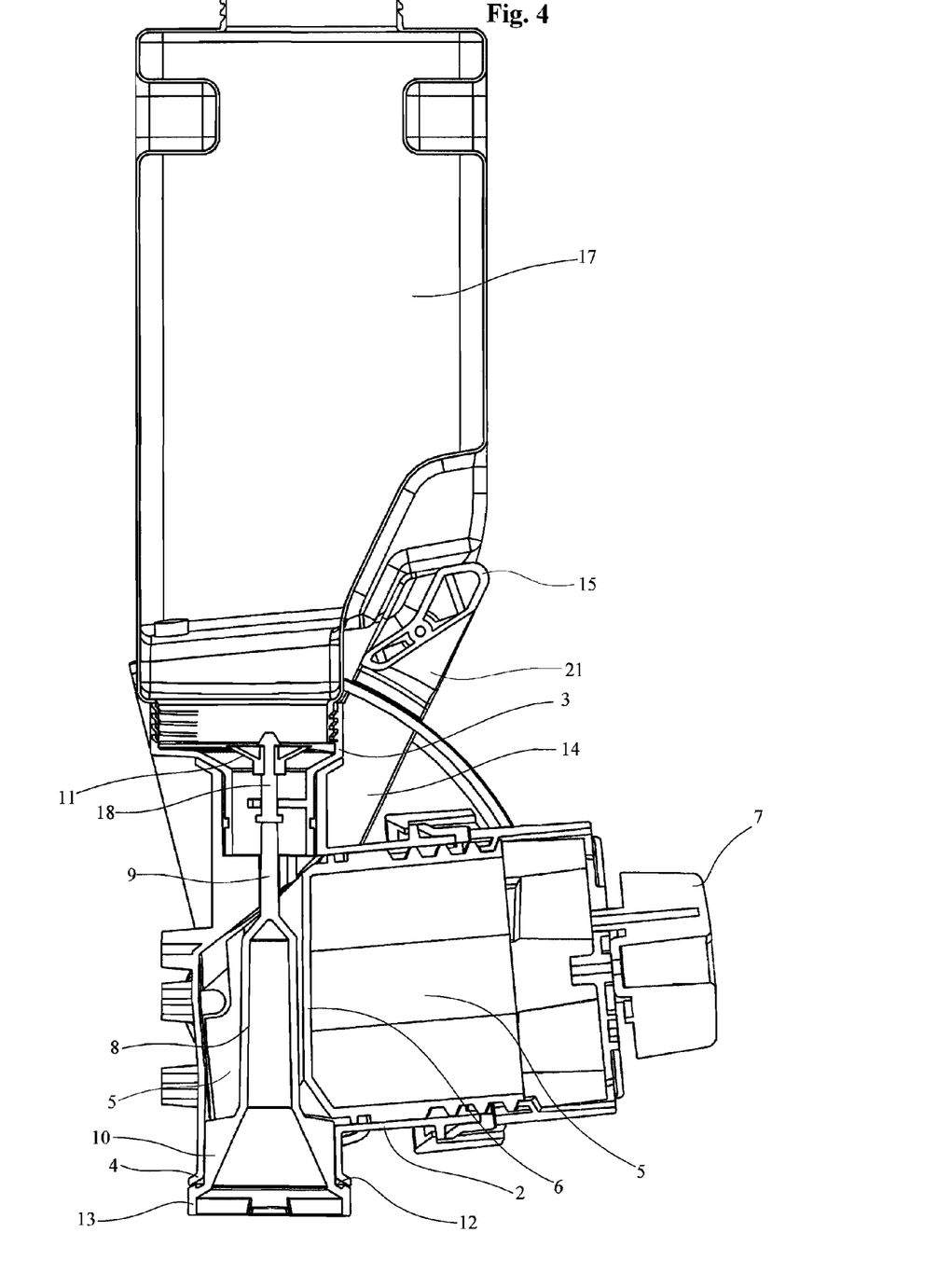
FIG. 4 shows a cross-section of the object of FIG. 3 according to a plane parallel to the view and passing through the valve body.
Figure 5:
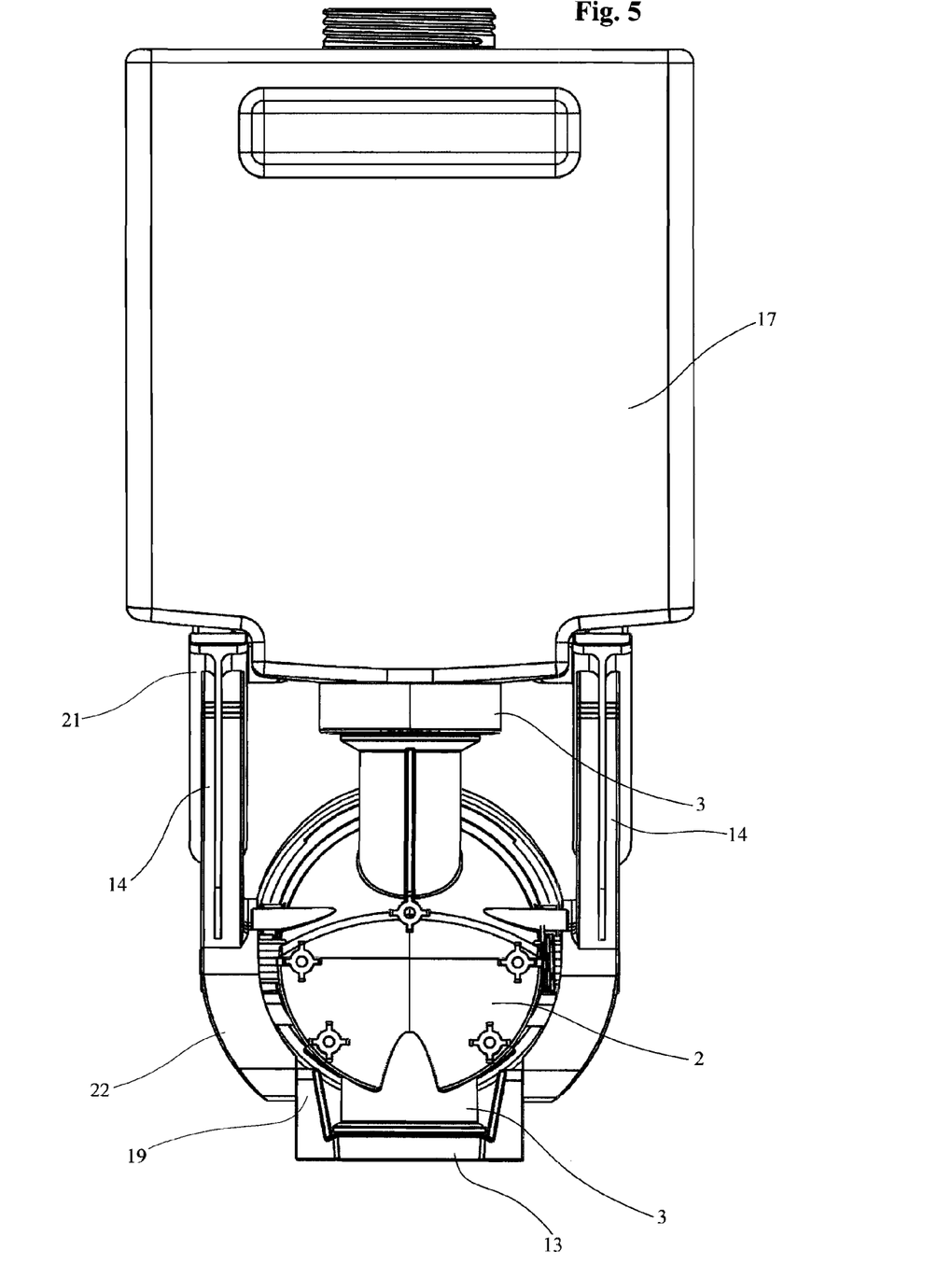
FIG. 5 shows a rear plan view of the object of the invention.
Figure 6:
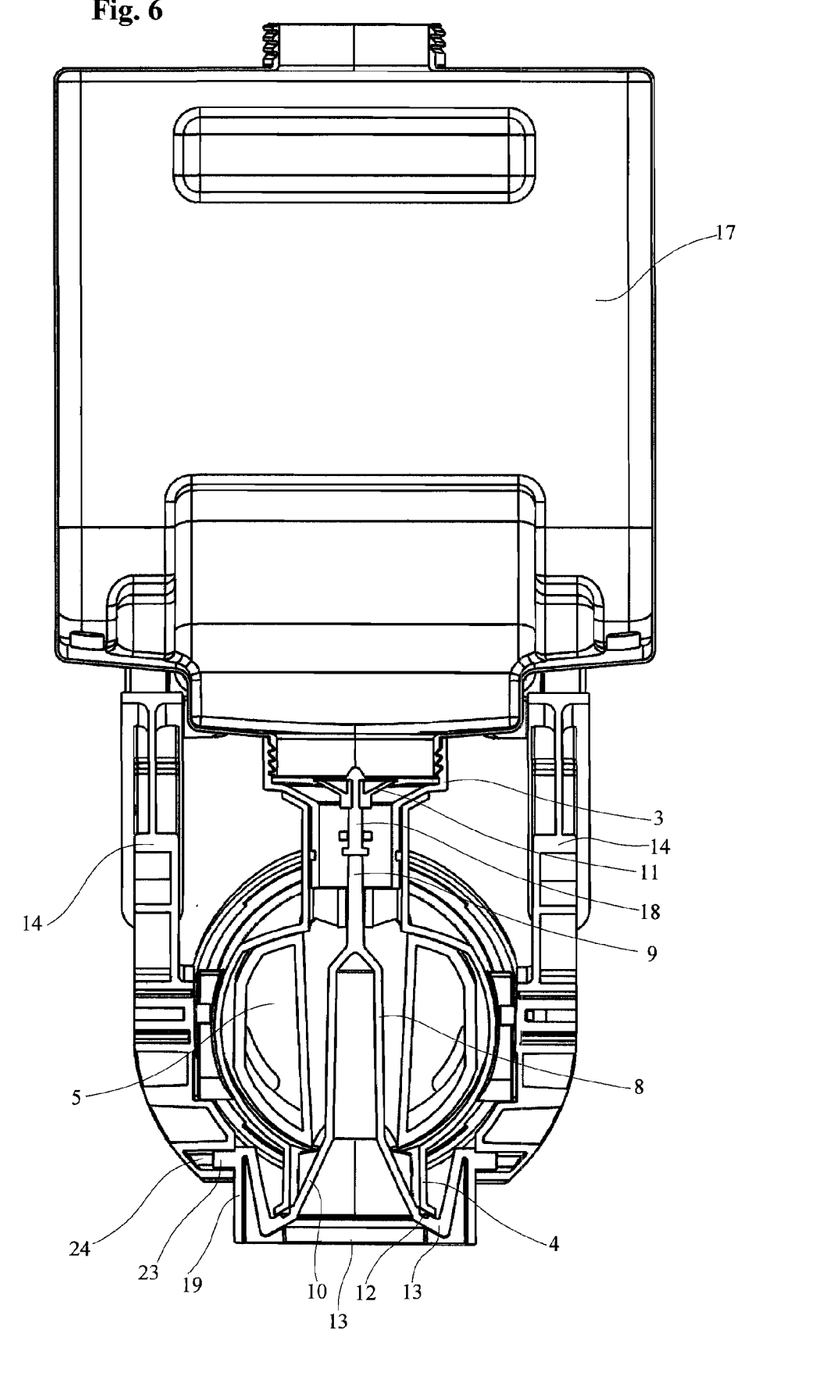
FIG. 6 shows a cross-section of the object of FIG. 5 according to a plane parallel to the plan view and passing through the valve body.
Figure 7:
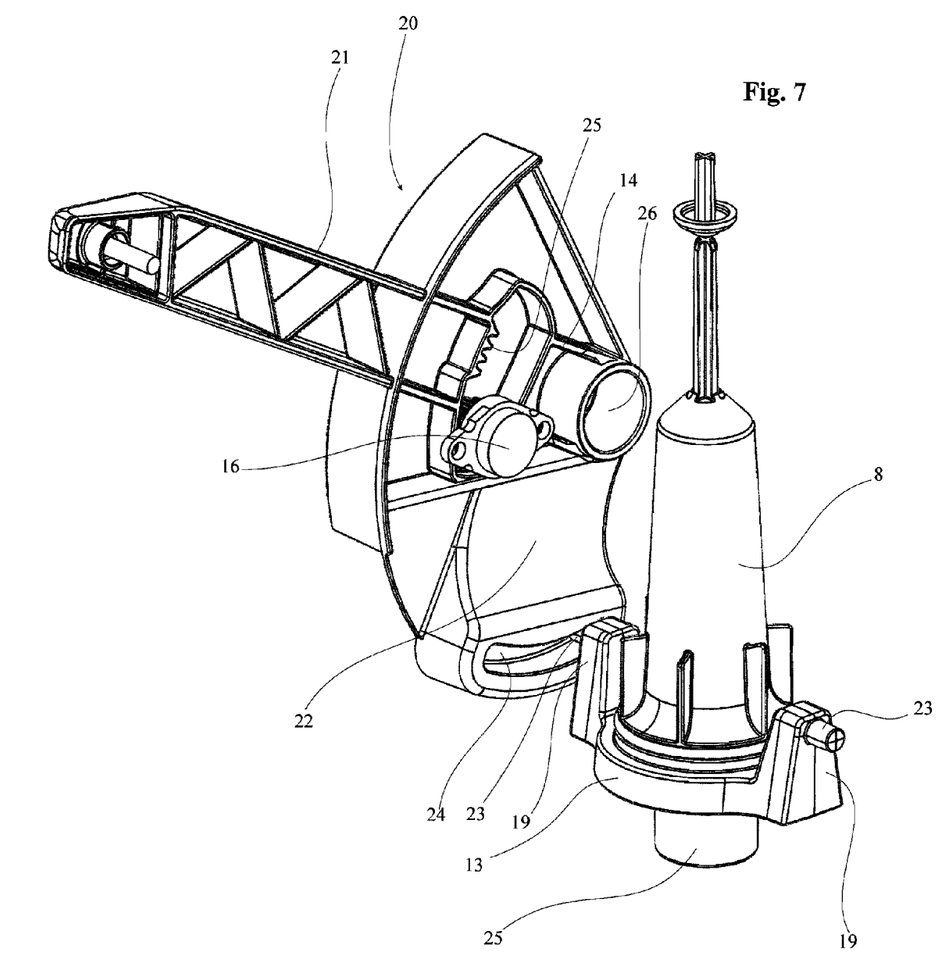
FIG. 7 shows a perspective view, in a separate manner, of just the valve and one lever to highlight the relative connection of the valve to the actuating devices.

FIG. 7 shows an example of a device that allows the clutch to be active only for a part of the travel movement of the levers 14, composed of a profile with 25 teeth, on which the clutch 16 engages for a partial stretch of said travel.

With this differentiated movement in the repositioning speed of the valve 8 from the open position to the closed one, we get the advantageous effect of maintaining the outlet section of the outlet pipe 4 open for a longer period of time, which is favorable to the speedy release of the liquid detergent, and the advantageous effect of reducing the time and closing the outlet pipe 4 more quickly and safely by the valve 8 repositioning in the closed state.

In practice we have verified how the invention does the job and attains the pre-set purposes.

In particular with this invention we have developed actuating devices that move the valve of a dosing device and which are joined to the outside body of the dosing device.

In particular, with the invention, a joint was made between the actuating devices that is reliable, easily inspected and easily maintained.

Furthermore, with the invention we have developed a movement of the operating levers whose travel ideally reproduces the state of the flow of the liquid detergent.

And last but not least, with the invention we have developed a displacement of the valve for closing the outlet pipe that is opportunely differentiated to facilitate the discharge speed of the liquid detergent, in less time, slowing down the reclosing movement with a clutch, and deactivating and rendering inactive said clutch near the closing of the outlet pipe for a quick and secure closing displacement of the valve.

The invention conceived in this way is open to numerous modifications and variants, all falling within the ambit of the inventive concept; moreover all the parts can be replaced by other technically equivalent components.

In practice, the materials used, as well as the dimensions and the contingent forms, can vary according to requirements and the state of the technology.

Where the characteristics and the technologies mentioned in any claim are followed by reference marks, these marks have been placed with the only aim of increasing the understanding of the claims and as a result these reference marks have no limiting effect on the interpretation of each element identified by way of example by these reference marks.

What is claimed is:

1. A detergent dosing device for soaking cleaning cloths, comprising:
   a body equipped with a storage chamber;
   at least one actuating device for moving a valve fixed inside the body;
   an outlet pipe on a bottom of the body for releasing the liquid detergent stored inside the storage chamber upon actuation of the at least one actuating device, an outlet section of the outlet pipe being closed by the valve and opened by rectilinear displacement of the valve along a main axis of the valve by the at least one actuating device, the at least one actuation device being joined to the valve by means of a connection on the outside of the body; and
   wherein the connection on the outside of the body is integrally formed with a protruding part at the bottom of the valve.

2. A detergent dosing device for soaking cleaning cloths, comprising:
   a body equipped with a storage chamber;
   at least one actuating device for moving a valve fixed inside the body;
   an outlet pipe on a bottom of the body for releasing the liquid detergent stored inside the storage chamber upon actuation of the at least one actuating device, an outlet section of the outlet pipe being closed by the valve and opened by rectilinear displacement of the valve along a main axis of the valve by the at least one actuating device, the at least one actuation device being joined to the valve by means of a connection on the outside of the body; and
   wherein the connection between the valve and the at least one actuating device takes the form of a lower extension of the valve on the outside of the body, joined to a track, whose generatrix has a diverging radius on the end of an arm of a lever, an opposite arm of the lever, with respect to a hinging fulcrum, has a grip adapted for manual movement of the actuating devices.

3. The detergent dosing device of claim 2 wherein the lever is pivoted on the outside of the body, whereby the lever can be easily accessed and readily serviced.

4. The detergent dosing device of claim 3 wherein the grip, which is adapted to be manually operated by an operator, is on a front part of the dosing device positioned in an ergonomic manner.

5. The detergent dosing device of claim 2 wherein the rotational movement of the lever reproduces a flow behavior of the liquid detergent, whereby it is intuitive to learn how to use the dosing device.

6. The detergent dosing device of claim 2 wherein the lever is limited in rotational travel between a top position and a bottom position, each corresponding respectively to terminal positions of the valve in an open and closed condition of the outlet pipe.

7. The detergent dosing device of claim 2 wherein the travel of the movement of the lever from the top downwards corresponds to a linear lowering of the valve with the respective opening of the outlet pipe for the liquid detergent stored inside the dosing device, and is carried out directly by the operator holding the grip connected solidly at the end of the arm in front of the lever.

8. The detergent dosing device of claim 2 wherein the travel of the lever from the bottom upwards corresponds to a linear displacement of the valve closing the outlet pipe and is brought about by at least one elastic device that urges the lever into the top position, the at least one elastic device disposed on the outside of the dosing device and acting either directly on the valve, near the lower end of the valve, or directly on the operating lever.

9. The detergent dosing device of claim 8 wherein the travel of the lever for reclosing the valve is slowed by a device for damping the motion or a clutch which prolongs the closing of the valve, thereby making sure that all the liquid detergent that has been stored therein flows from the dosing device before the valve fully closes the outlet pipe.

* * * * *